(12) United States Patent
Wu et al.

(10) Patent No.: US 11,034,243 B2
(45) Date of Patent: Jun. 15, 2021

(54) VEHICLE BATTERY CONTROLLER BASED ON A REDUCED ORDER MODEL

(71) Applicant: SF Motors, Inc., Santa Clara, CA (US)

(72) Inventors: Bin Wu, Santa Clara, CA (US); Ying Liu, Santa Clara, CA (US); Yifan Tang, Santa Clara, CA (US)

(73) Assignees: Chongqing Jinkang New Energy Vehicle Co., Ltd., Chongqing (CN); SF Motors, Inc., Santa Clara, CA (US)

( * ) Notice: Subject to any disclaimer, the term of this patent is extended or adjusted under 35 U.S.C. 154(b) by 224 days.

(21) Appl. No.: 16/167,036

(22) Filed: Oct. 22, 2018

(65) Prior Publication Data

US 2020/0122581 A1     Apr. 23, 2020

(51) Int. Cl.
    *B60L 3/00*          (2019.01)
    *B60L 58/10*       (2019.01)
    *B60W 10/26*     (2006.01)
    *B60L 3/12*         (2006.01)

(52) U.S. Cl.
CPC .............. *B60L 3/0046* (2013.01); *B60L 58/10* (2019.02); *B60W 10/26* (2013.01); *B60L 3/12* (2013.01); *B60L 2240/36* (2013.01); *B60L 2240/549* (2013.01); *B60L 2250/16* (2013.01); *B60L 2260/42* (2013.01); *B60L 2260/44* (2013.01); *B60L 2260/50* (2013.01)

(58) Field of Classification Search
CPC .... B60L 3/0046; B60L 58/10; B60L 2260/44; B60L 3/12; B60L 2250/16; B60L 2260/50; B60L 2260/42; B60L 2240/36; B60L 2240/549; B60W 10/26
See application file for complete search history.

(56) References Cited

U.S. PATENT DOCUMENTS

| | | | |
|---|---|---|---|
| 4,045,721 | A | 8/1977 | Swain |
| 5,160,880 | A | 11/1992 | Palanisamy |
| 6,016,047 | A | 1/2000 | Notten et al. |
| 6,232,750 | B1 | 5/2001 | Podrazhansky et al. |

(Continued)

OTHER PUBLICATIONS

Baronti, F. et al., "Comparing Open-Circuit Voltage Hysteresis Models for Lithium-Iron-Phosphate Batteries," IEEE, 2014.

(Continued)

*Primary Examiner* — Dale W Hilgendorf
(74) *Attorney, Agent, or Firm* — Foley & Lardner LLP; James De Vellis

(57) ABSTRACT

A vehicle battery controller based on a reduced order model is provided. The controller identifies a value of a current output by the battery that supplies power to the vehicle. The controller provides the value of the current to a solid diffusion component, an electrolyte transport component, and a electrolyte and solid potential component. The solid diffusion component can update a solid concentration model of the battery. The electrolyte transport component can update an electrolyte concentration model of the battery. The electrolyte and solid potential component can update an electrolyte potential model and a solid potential model of the battery. The controller component can determine a value of a voltage of the battery and a value of a heat generation rate of the battery. The controller component can generate a command to manage a performance of the battery.

20 Claims, 6 Drawing Sheets

(56) References Cited

U.S. PATENT DOCUMENTS

| | | | |
|---|---|---|---|
| 6,456,042 B1 | 9/2002 | Kwok | |
| 8,018,203 B2 * | 9/2011 | Nishi et al. | B60L 3/0046 |
| | | | 320/136 |
| 8,336,651 B2 * | 12/2012 | Nishi et al. | B60L 3/0046 |
| | | | 320/136 |
| 9,939,494 B2 * | 4/2018 | Ogura | H01M 10/48 |
| 10,209,319 B2 * | 2/2019 | Kaiya et al. | H01M 10/486 |
| 10,449,861 B1 * | 10/2019 | Wu | B60L 3/0046 |
| 2004/0219053 A1 | 11/2004 | Fetcenko et al. | |
| 2009/0276172 A1 * | 11/2009 | Nishi | G01R 31/367 |
| | | | 702/63 |
| 2014/0197805 A1 | 7/2014 | Greening et al. | |
| 2014/0333317 A1 * | 11/2014 | Frost | G01R 31/382 |
| | | | 324/430 |
| 2015/0355615 A1 * | 12/2015 | Lee | G01R 31/007 |
| | | | 700/275 |
| 2016/0087461 A1 | 3/2016 | Greening et al. | |

OTHER PUBLICATIONS

Notice of Allowance on U.S. Appl. No. 16/232,980 dated Jun. 12, 2019 (9 pages).
Non-Final Office Action on U.S. Appl. No. 16/232,980 dated Mar. 15, 2019.

* cited by examiner

VEHICLE BATTERY CONTROLLER BASED ON A REDUCED ORDER MODEL

BACKGROUND

Vehicles such as automobiles can include batteries that provide power to components of the vehicle. The amount of power or the duration of power supplied by the battery can vary.

SUMMARY

The present disclosure is directed to systems and methods of managing battery performance of a vehicle, such as an electric vehicle or hybrid electric and gas vehicle.

At least one aspect is directed to a system to manage battery performance of a vehicle. The system can include a battery management system. The battery management system can include one or more processors and memory, a database, a solid diffusion component, an electrolyte transport component, an electrolyte and solid potential component, and a battery controller component. The database can store a profile for a battery of the vehicle. The vehicle can include a sensor to identify a value of a current output by the battery that supplies power to the vehicle. The solid diffusion component can update, based on the value of the current and the profile, a solid concentration model of the battery. The electrolyte transport component can update, based on the value of the current and the profile, an electrolyte concentration model of the battery. The electrolyte and solid potential component can update, based on the value of the current and the profile, an electrolyte potential model of the battery. The electrolyte and solid potential component can update, based on the value of the current and the profile, a solid potential model of the battery. The battery controller component can determine, based on the solid concentration model updated by the solid diffusion component, the electrolyte concentration model updated by the electrolyte transport component, the electrolyte potential model updated by the electrolyte and solid potential component, and the solid potential model updated by the electrolyte and solid potential component, a value of a voltage of the battery and a value of a heat generation rate of the battery. The battery controller component can generate, based on the value of the voltage of the battery and the value of the heat generation rate of the battery, a command to manage a performance of the battery.

At least one aspect is directed to a method of managing battery performance of a vehicle. The method can be performed by a battery management system of a vehicle comprising one or more processors and me memory. The method can include the battery management system retrieving, from a database, a profile for a battery of the vehicle. The method can include a sensor of the vehicle identifying a value of a current output by the battery that supplies power to the vehicle. The method can include the battery management system updating, based on the value of the current and the profile, a solid concentration model of the battery. The method can include the battery management system updating, based on the value of the current and the profile, an electrolyte concentration model of the battery. The method can include the battery management system updating, based on the value of the current and the profile, an electrolyte potential model of the battery. The method can include the battery management system updating, based on the value of the current and the profile, a solid potential model of the battery. The method can include a battery controller component determining, based on the solid concentration model, the electrolyte concentration model, the electrolyte potential model, and the solid potential model, a value of a voltage of the battery and a value of a heat generation rate of the battery. The method can include the battery controller generating, based on the value of the voltage of the battery and the value of the heat generation rate of the battery, a command to manage a performance of the battery.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
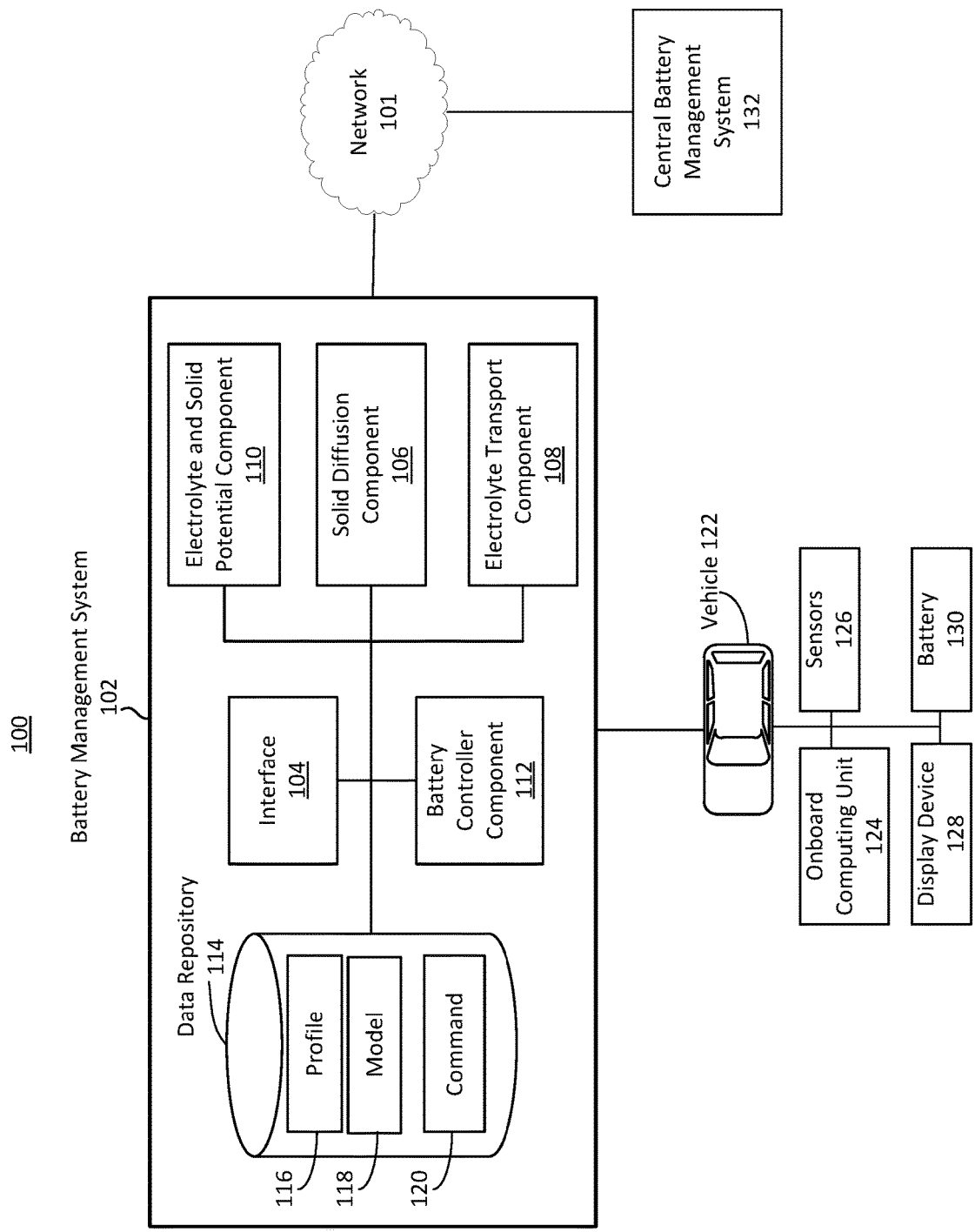
FIG. 1 depicts a block diagram depicting an example system to manage battery performance of a vehicle, in accordance with an implementation.

Following below are more detailed descriptions of various concepts related to, and implementations of, methods, apparatuses, and systems of managing batter performance of a vehicle. The various concepts introduced above and discussed in greater detail below may be implemented in any of numerous ways.

The present disclosure is directed to systems and methods of managing battery performance of a vehicle, such as an electric vehicle or hybrid electric and gas vehicle. The vehicle, for example, can include one or batteries having one or more battery cells. The batteries can provide power to various component of the vehicle, such as an electric motor. To determine or predict the amount of battery power available, such as in order to estimate the distance an electric vehicle can travel before recharging the battery, a battery management system can measure or identify values associated with the battery use, and estimate an amount of remaining power in the battery.

However, accurately and reliably predicting performance-related metrics of the battery can be challenging due to various factors. For example, predicting battery performance can be computationally intensive, utilizing excessive amounts of processing power or memory utilization. Predicting battery performance can be slow or take a significant amount of time due to the level of complexity of the prediction techniques and the processing capacity of the battery management system or processors thereof. Further, there can be a tradeoff between the length of time the system can take to provide an estimate and the accuracy or reliability of the estimate. For example, a more accurate or reliable the estimate of a battery performance metric can take longer to generate as compared to a less accurate or reliable estimate. Thus, it can be challenging to determine or estimate a battery performance-related metric in real-time in order to generate a command to control an aspect of a vehicle having one or more components powered by the battery.

For example, a system configured with a mathematical model of a battery cell can determine aspects of the internal behavior of lithium-ion batteries. Such an electrochemical model may include simultaneously solving numerous strongly-coupled and non-linear partial differential equations, which can be computationally expensive (e.g., utilize excessive processing power, memory, or input/output or data read/write accesses). Due to the high computational resource utilization of the electrochemical model, it may be inefficient or not possible to apply the electrochemical model in a battery management system or to optimize battery cell design. Circuit models, as opposed to mathematical electrochemical models, are superior in terms of computational efficiency, but lack the physical meanings, thereby resulting in low accuracy and reliability. Physics based reduced order models ("ROM") can achieve a good balance between the accuracy and computational efficiency. However, the assumptions made in developing the ROM and the formulation of ROM strongly affect the accuracy of the results and the computational efficiency. For example, invalid inputs or assumptions, or erroneous treatments, can result in large errors.

Systems and methods of the present technical solution provide a system to manage battery performance. The technical solution includes a battery management system configured with modularized components that can realize an electrochemical reduced order model for lithium-ion batteries. The modularized structure of the battery management system allows to solve the solid diffusion equation using a numerical method, such as finite difference method. This can improve the prediction accuracy for batteries with low diffusivity or large particle size, relative to solving the solid diffusion equation using other methods, thereby providing better accuracy in predicting voltage and heat generation rate.

For example, the battery management system can include a main program (e.g., a battery controller component) and three supporting components or modules, such as the solid diffusion component, electrolyte transport component and electrolyte and solid potential component. The battery controller component can take the battery current as the inputs. With an assumption that the current density across the electrode thickness is uniform, this current input can be transferred to the three components to update the solid concentration, electrolyte concentration, solid potential and electrolyte potential. This process can avoid the iterations of several strongly-coupled non-linear partial differential equations, which can cause the high computational cost in a full order model. The outputs from the three components can further feed back to the battery controller to calculate the voltage and heat generation rate.

The battery management system of the present technical solution can simulate the voltage and heat generation rate of a lithium-ion battery cell. The battery management system can receive two sets of inputs: i) electrochemical parameters of the lithium-ion battery cell, including the particle size, electrode thickness, porosity, open circuit voltage, etc.; and ii) current profiles, which can be given as a time-dependent function. The outputs of the battery management system can include the voltage, heat generation rate, electrolyte concentration profiles, or particle concentration profiles. Further, the battery management system can generate a command to control the performance of the vehicle using the battery, or provide a notification related to the battery performance.

Thus, the highly modularized structure of the battery management system of the present technical solution provides for the flexible treatments in different components. For example, in the solid diffusion component, the solid diffusion equation can be solved using finite difference method, finite volume method or finite element method. The battery management system can further be simplified by setting the solid concentration in accordance with a polynomial profile. These configurations can be embedded in the solid diffusion component, and thus remain invisible from other components. As a result, many new features can be added to the battery management system to enhance the performance of the ROM.

The battery management system of the present technical solution can provide various technical improvements, advantages or new features with regard to battery management functions or battery design functions. For example, the battery management system of the present technical solution or improvement can provide the solid diffusivity as a function of solid concentration. Since the solid diffusion component can be configured to solve the diffusion equation using the finite difference method, finite volume method or finite element method, the solid diffusion component can generate a concentration-dependent diffusivity. The battery management system of the present technical solution or improvement can evaluate the dependence of electrolyte activity coefficient on electrolyte concentration. The battery management system of the present technical solution can take into account the electrolyte activity coefficient to account for non-ideal behaviors of concentrated electrolyte, as the activity coefficient can have a dependence on the concentration. Failure to take this dependence into account can lead to errors in predicting the voltage and heat generation rate. The battery management system of the present technical solutions can address an open circuit voltage ("OCV") hysteresis effect, which can refer to the difference between the charging OCV curve and discharging OCV curve. The battery management system, by taking into account this effect, can facilitate accurately modeling the voltage under highly dynamic currents, such as in a low state of charge range. To do so, the battery management system can model the hysteresis voltage by solving a first-order relaxation equation. The battery management system of the present technical solution or improvement can further break down the sources of heat generation rates. For example, the battery management system can determine that the heat generated in the lithium-ion batteries can be attributed to electrolyte ohmic heat, solid ohmic heat, reaction heat or reversible heat. The battery management system of the present technical solution or improvement can analyze particle/electrolyte concentration profiles in order to generate and output the particle concentration profiles and electrolyte concentration profiles to the user, which can be used for battery management, battery design, or battery manufacturing. Analyzing the particle/electrolyte concentration profiles in order to generate and output the particle concentration profiles and electrolyte concentration profiles allows for improved battery management, battery design, or battery manufacturing relative to just providing a particle surface concentration or average electrolyte concentration.

Thus, systems and methods of the present technical solution can provide improved accuracy in predicting the voltage and heat generation rate, such as when the particle size is large or solid diffusivity is low, while being computationally more efficient, thereby reducing computing resource utilization. Further, due to the reduced computation resource utilization of the present technical solution, the battery management system can of the present technical solution can be configured to simulate driving cycles where the currents are always changing. For example, the battery management system can more accurately and reliably simulate a driving cycle (e.g., a US06 SFTP driving cycle having various driving characteristics such as 8.01 mile route with an average speed of 48.4 miles/hour, maximum speed of 80.3 miles/hour, and a duration of 596) within 160 seconds, as compared to a less accurate or reliable simulation that can take multiple days to perform.

The battery management system of the present technical solution, by providing increased accuracy with greater computational efficiency, can be used in a vehicle having a battery, such as an electric vehicle or hybrid vehicle, to improve charging capabilities (e.g., avoid or prevent overcharging), providing estimates of remaining driving distance, or generating other commands or notification related to real-time driving conditions. Further, the battery management system of the present technical solution can significantly reduce the battery design process, thereby providing an improvement to the process of battery design and manufacturing, while also resulting in an improvement battery with improved battery performance characteristics.

FIG. 1 depicts a block diagram depicting an example system to manage battery performance of a vehicle. The system 100 can include at least one battery management system 102 that is designed, constructed, or operational to receive input regarding a battery characteristic, and generate an output regarding a battery performance-related metric or other battery profile information. The battery management system 102 can include at least one interface 104, at least one solid diffusion component 106, at least electrolyte transport component 108, at least electrolyte and solid potential component 110, at least one battery controller component 112, and at least one data repository 114. The battery management system 102, or one or more component thereof, can include hardware or a combination of hardware and software, such as communications buses, circuitry, processors, communications interfaces, among others. The battery management system 102 can reside on or within a vehicle (e.g., vehicle 122), on a computing device, on a server, or other location or hardware infrastructure configured to facilitate vehicle or battery control, design, or manufacturing.

The data repository 114 can store, manage or reference information to facilitate battery control, design, or manufacturing. The data repository 114 can include one or more data structure, databases or data files to store the information. For example, the data repository 114 can include profile information 116, model information 118, or command information 120. The profile information 116 can include, for example, a profile data structure. The profile information 116 can include, for example, battery profile information such as electrochemical parameters. The profile can include electrochemical parameters for the battery, such as a particle size, an electrode thickness, a porosity, or an open circuit voltage. The profile information 116, including the input parameters of Table 1, can be input into a component of the battery management system 102 for further processing. Examples of additional profile information 116 are provided in Table 1.

TABLE 1

| Profile Information | |
|---|---|
| Name | Unit |
| Anode particle radius | μm |
| Cathode particle radius | μm |
| Anode solid diffusivity | $m^2/s$ |
| Cathode solid diffusivity | $m^2/s$ |
| Anode solid maximum concentration | $mol/m^3$ |
| Cathode solid maximum concentration | $mol/m^3$ |
| Anode stoichiometry at 0% SOC | — |
| Anode stoichiometry at 100% SOC | — |
| Cathode stoichiometry at 0% SOC | — |
| Cathode stoichiometry at 100% SOC | — |
| Cell cross area | $m^2$ |
| Anode film resistance | $\Omega m^2$ |
| Cathode film resistance | $\Omega m^2$ |
| Anode exchange current density at reference state | $A/m^2$ |
| Cathode exchange current density at reference state | $A/m^2$ |
| Electrolyte transference number | — |
| Initial electrolyte concentration | $mol/m^3$ |
| Electrolyte conductivity | S/m |
| Electrolyte diffusivity | $m^2/s$ |
| Anode solid conductivity | S/m |
| Cathode solid conductivity | S/m |
| Anode thickness | μm |
| Separator thickness | μm |
| Cathode thickness | μm |
| Anode Bruggeman exponent | — |
| Separator Bruggeman exponent | — |
| Cathode Bruggeman exponent | — |
| Anode active materials volume ratio | — |
| Anode electrolyte volume ratio | — |
| Cathode active materials volume ratio | — |
| Cathode electrolyte volume ratio | — |
| Separator electrolyte volume ratio | — |
| Anode entropy coefficient | V/K |
| Cathode entropy coefficient | V/K |
| Anode open circuit voltage | V |
| Cathode open circuit voltage | V |

For example, cathode materials used in lithium batteries can include Lithium cobalt oxide $LiCoO_2$, Lithium nickel oxide $LiNiO_2$, Lithium manganese oxide $LiMn_2O_4$, or Lithium iron phosphate $LiFePO_4$. Example anode materials can include Carbon C, Lithium Li, or Lithium titanate $Li_2TiO_3$. The particle size can be measured as a radius. For example, the cathode or anode particle size can be 9 microns (μm), 10 microns, 11 microns, 11.2 microns, or some other value. The electrode thickness of the battery can also be measured in microns. The electrode thickness can refer to the thickness of the anode or the cathode. The porosity of a porous electrode can affect the kinetics for ionic diffusion.

The data repository 114 can include or store one or more models 118. The model 118 can refer to any model that can be used by the battery management system 102. To determine, predict, evaluate or otherwise identify parameter, metric, behavior or characteristic associated with a battery or battery cell (e.g., battery 130). Models 118 can include, for example, a solid concentration model, electrolyte concentration model, electrolyte potential model, or solid potential model. The data repository 114 can store or include different models 118 for different types of batteries. The data repository 114 can include or store commands 120. Commands 120 can include, for example, instructions, control commands, vehicle controls, alerts, or notifications. Commands 120 can include instructions to modify or change a parameter or function related to battery utilization.

The system 100 can include or interface with a central battery management system 132. The central battery management system 132 can include one or more component or functionality of the battery management system 102. For example, the battery management system 102 can be referred to as a vehicle battery management system, and the central battery management system 132 can be remote from the vehicle battery management system. The central battery management system 132 can communicate or interface with the vehicle battery management system 102. The central battery management system 132 can communicate or interface with one or more component of the vehicle 122, for example via the battery management system 102.

Each of the components of the battery management system 102 or central battery management system 132 can be implemented using hardware or a combination of software and hardware. Each component of the battery management system 102 (or central battery management system 132) can include logical circuity (e.g., a central processing unit or CPU) that responses to and processes instructions fetched from a memory unit (e.g., memory 615 or storage device 625). Each component of the battery management system 102 can include or use a microprocessor or a multi-core processor. A multi-core processor can include two or more processing units on a single computing component. Each component of the battery management system 102 can be based on any of these processors, or any other processor capable of operating as described herein. Each processor can utilize instruction level parallelism, thread level parallelism, different levels of cache, etc. For example, the battery management system 102 can include at least one logic device such as a computing device or server having at least one processor to communicate via the network 101. A battery management system 102 of the vehicle 122 can communicate with a different battery management system 102 or central battery management system 132.

The components and elements of the battery management system 102 can be separate components, a single component, or part of the battery management system 102. For example, the interface 104, solid diffusion component 106, electrolyte transport component 108, electrolyte and solid potential component 110, battery controller component 112 (and the other elements of the battery management system 102) can include combinations of hardware and software, such as one or more processors configured to initiate stop commands, initiate motion commands, and transmit or receive timing data, for example.

One or more component of the battery management system 102 can be hosted on or within a vehicle 122. One or more components of the battery management system 102 can reside outside or remote from the vehicle 122, and be in communication with the vehicle for at least a certain time period. For example, portions of data illustrated on the data repository 114 can reside on a remote server, a central battery management system 132, or cloud of servers, that can maintain profile information, models, commands, or other information that can be accessed by the battery management system 102 (e.g., through network 101). The components of the battery management system 102 can be connected or communicatively coupled to one another. The connection between the various components of the battery management system 102 can be wired or wireless, or any combination thereof. Counterpart systems or components can be hosted on other vehicles to enable communication or coordination between vehicles.

The network 101 can include computer networks such as the internet, local, wide, near field communication, metro or other area networks, as well as satellite networks or other computer networks such as voice or data mobile phone communications networks, and combinations thereof. The network 101 can include or constitute an inter-vehicle communications network, e.g., a subset of components including the battery management system 102 and components thereof for inter-vehicle data transfer. The network 101 can include a point-to-point network, broadcast network, telecommunications network, asynchronous transfer mode network, synchronous optical network, or a synchronous digital hierarchy network, for example. The network 101 can include at least one wireless link such as an infrared channel or satellite band. The topology of the network 101 can include a bus, star, or ring network topology. The network 101 can include mobile telephone or data networks using any protocol or protocols to communicate among vehicles or other devices, including advanced mobile protocols, time or code division multiple access protocols, global system for mobile communication protocols, general packet radio services protocols, or universal mobile telecommunication system protocols, and the same types of data can be transmitted via different protocols.

The vehicle 122 can refer to any type of vehicle or automobile such as cars, trucks, vans, sports utility vehicles, motorcycles, self-driving vehicle, or driver assist vehicle. The vehicle 122 can include an onboard computing unit 124. The onboard computing unit 124 can include one or more of hardware, software or firmware. The onboard computing unit 124 can include digital components or circuitry, including, for example, one or more component depicted in FIG. 6.

The onboard computing unit 124 can include or interface with, for example, an electronic control unit ("ECU") of the vehicle 122 to provide drive-by-wire functionality. The onboard computing unit 124 can include or be referred to as an automotive computer, and can include a processor or microcontroller, memory, embedded software, inputs/outputs and communication link(s). An ECU involves hardware and software to perform the functions expected from that particular module. For example, types of ECU include Electronic/engine Control Module (ECM), Powertrain Control Module (PCM), Transmission Control Module (TCM), Brake Control Module (BCM or EBCM), Central Control Module (CCM), Central Timing Module (CTM), General Electronic Module (GEM), Body Control Module (BCM), Suspension Control Module (SCM), control unit, or control module. Other examples include domain control unit (DCU), Electric Power Steering Control Unit (PSCU), Human-machine interface (HMI), Telematic control unit (TCU), Speed control unit (SCU), Battery management system (BMS). For example, the onboard computing unit 124 of the vehicle 122 can query one or more component or module of vehicle 122 to determine a status of the vehicle 122, which can include, for example, a location or GPS position of the vehicle, speed of the vehicle, acceleration of the vehicle, turn angle of the vehicle, orientation of the vehicle, throttle of the vehicle, brake status or brake amount, or other information.

The vehicle 122 can include or interface with one or more sensors 126. The sensors 126 can be coupled to or associated with a vehicle 122. The sensors 126 can provide information to the battery management system 102. The one or more vehicle 122 can include sensors 126 that are designed, constructed, configured or operational to detect a value of a current output from the battery 130. Sensors 126 can include measurement devices configured to measure, detect, or determine characteristics of electricity associated with a battery 130 of the vehicle, such as a current, voltage, or impedance. Sensors 126 can include an ammeter, volt meter, or multimeter. The sensor 126 can measure current, such as a flow of electric charge or coulombs per second in units of amperes. Sensors 126 can include a temperature sensor, thermometer, or ambient temperature sensor. The sensors 126 can be part of the vehicle 122, or remote from the vehicle 122. Sensors 126 can include, for example, a radar sensor, lidar sensor, or camera. Sensors 126 of the vehicle 122 can include accelerometers, gyroscopes, weight sensors, or proximity sensors, that can collect, detect or determine vehicle dynamics information such as orientation data, velocity, or weight.

Sensors 126 can include one or more sensing elements or transducers that capture, acquires, records or converts information about vehicle 122 or environment into a form for processing. The sensor 126 can acquire one or more images or recordings (e.g., photographic, radar, ultrasonic, millimeter wave, infra-red, ultra-violet, light detection and ranging or lidar, or audio, or video). The sensor 126 can communicate sensed data to the battery management system 102 for processing.

The sensor 126 can include a camera as well as one or more sensors of one or more types. For example, the sensor 126 can include a Radar, light detection and ranging (LIDAR), ultrasonic, or vehicle-to-everything (V2X) (e.g., vehicle-to-vehicle (V2V), vehicle-to-infrastructure (V2I), vehicle-to-device (V2D), or vehicle-to-passenger (V2P)) sensor or interface. The sensor 126 can include a global positioning system (GPS) device that can determine a location of the vehicle using map data. The sensor 126 can detect (e.g., using motion sensing, imaging or any of the other sensing capabilities) whether any other vehicle or object is present at or approaching the vehicle 122.

The vehicle 122, via sensor 126 or the onboard computing unit 124, can interface or communicate with a location system via network 101. The location system can include any device based on a positioning system such as Global Navigation Satellite System (GNSS), which can include GPS, GLONASS, Galileo, Beidou and other regional systems. The location system can include one or more cellular towers to provide triangulation. The location system can include wireless beacons, such as near field communication beacons, short-range wireless beacons (e.g., BLUETOOTH, a standard for short-range wireless interconnection, beacons), or Wi-Fi modules. The vehicle 122 can include or interface with a device, component, antenna, or other module or element to determine a location of the vehicle 122 via the location system.

The vehicle 122 can include a display device 128. The display device 128 can include, for example, a vehicle dash, LCD, LED, or other electronic or digital visual display communicatively coupled to the onboard computing unit 124 or battery management system 102. The display device 128 can include a heads-up display, mechanical display, or digital or electronic display.

The vehicle 122 can include a battery 130. The battery 130 can be a rechargeable battery. The battery can be a one-time-use or disposable battery. The battery can include one or more battery cells. For example, battery 130 can refer to multiple battery cells. The multiple battery cells can be independent from one another, but stored in a same physical container or area. The multiple battery cells of the battery 130 can be electronically or communicatively coupled to on another. For example, the one or more battery cells in the battery 130 can be connected by electronic circuitry in a series or in a parallel configuration. The battery management system 102 can monitor, manage, or control aspects of the battery 130.

The battery 130 can include one or more cells. A cell can refer to the electrochemical current-producing unit in a battery, consisting of a set of positive plates, negative plates, electrolyte, separators and casing. The cell can have an open-circuit voltage of, for example, 1 volt, 2 volts, 3 volts, volts or some other voltage. There can be multiples cells in a single battery 130. Types of batteries 130 or battery cells can include, for example, lead-acid ("flooded", deep-cycle, and VRLA), NiCd, nickel-metal hydride, lithium-ion, Li-ion polymer, zinc-air or molten-salt batteries.

A lithium-ion battery or Li-ion battery (abbreviated as LIB) is a type of rechargeable battery in which lithium ions move from the negative electrode to the positive electrode during discharge and back when charging. Li-ion batteries use an intercalated lithium compound as one electrode material, compared to the metallic lithium used in a non-rechargeable lithium battery. The electrolyte, which allows for ionic movement, and the two electrodes are the constituent components of a lithium-ion battery cell. For example, lithium-ion battery can be used to provide power to an electric vehicle 122. A lithium-ion battery can have a high energy density, low memory effect, and a low self-discharge. Types of lithium based batteries 130 can include, for example, Lithium iron phosphate ($LiFePO_4$), lithium ion manganese oxide battery ($LiMn_2O_4$, $Li_2MnO_3$, or LMO), and lithium nickel manganese cobalt oxide ($LiNiMnCoO_2$ or NMC), lithium nickel cobalt aluminum oxide ($LiNiCoAlO_2$ or NCA) and lithium titanate ($Li_4Ti_5O_{12}$ or LTO), or lithium-sulfur batteries.

The battery management system 102 can include an interface 104. The interface 104 can be configured to use one or more protocols, wires, connectors, or ports to communicate with or facilitate communication among the one or more components of the battery management system 102, vehicle 122, or central battery management system 132. The interface 104 can include a hardware interface, software interface, wired interface, or wireless interface. The interface 104 can facilitate translating or formatting data from one format to another format. For example, the interface 104 can include an application programming interface that includes definitions for communicating between various components, such as software components. The interface 104 can be designed, constructed or operational to communicate with one or more sensors 126 to collect or receive information. The interface 104 can be designed, constructed or operational to communicate with a solid diffusion component 106, electrolyte transport component 108, electrolyte and solid potential component 110, battery controller component 112 or data repository 114.

The battery management system 102 can include, interface or otherwise access a battery controller component 112. The battery controller component 112 can be referred to as a main component, orchestrator component, or master component. For example, the battery controller component 112 can orchestrate, manage, or maintain one or more other components of the battery management system 102, such as the solid diffusion component 106, electrolyte transport component 108, or the electrolyte and solid potential component 110. For example, the battery controller component 112 can receive, from sensor 126, a characteristic of electricity associated with the battery 130. The characteristic of electricity associated with the battery 130 can include, for example, a current or flow of charge (e.g., represented in units such as amperes, or milliamperes). The current can correspond to moving electrons in a wire or carried by ions in an electrolyte.

The battery management system 102 (e.g., via battery controller component 112) can receive, detect, identify, or measure a value of a current output by the battery 130. The battery 130 can supply power to one or more component or motor of the vehicle 130. The battery management system 102 (e.g., via battery controller component) can provide, responsive to receiving the value of the current, the value of the current to one or more component of the battery management system 102 for further processing. The value of the current can include or refer to a time-dependent function of the current.

Table 2 illustrates an example full-order electrochemical model. The functions of the full-order electrochemical model illustrated in Table 2 can resolve the solid concentration in the particle domain (the coordinate along particle radius is denoted as r), and the electrolyte concentration, electrolyte potential and solid potential in the electrode domain (the coordinate along electrode thickness is denoted as x). The thickness of anode can be denoted as $l_n$, the thickness of separator as $l_s$, and the thickness of cathode as $l_p$. The anode, separator and cathode can occupy the regions of $0 \leq x \leq l_n$, $l_n \leq x \leq l_n + l_s$, and $l_n + l_s \leq x \leq l_n + l_s + l_p$, respectively.

lyte conductivity (S m$^{-1}$), $\phi_e$ is the potential in the electrolyte (V), R is the gas constant (J K$^{-1}$ mol$^{-1}$), T is temperature (K), $f_\pm$ is the electrolyte activity coefficient, $t_+$ is the lithium ion transference number, $\varepsilon_e$ is the electrolyte volume fraction, $c_e$ is the lithium concentration in the electrolyte (mol L$^{-1}$), $D_e^{eff}$ is the effective electrolyte diffusivity (m$^2$ s$^{-1}$) and $c_0$ is the initial lithium concentration in the electrolyte (mol L$^{-1}$).

The intercalation current density, i (A m$^{-2}$), is zero in the separator region. In the anode and cathode regions the current density is given by Function 5 (e.g., the Butler-Volmer equation) as follows, $$i = i_0 \left( \exp\left(\frac{\beta F \eta}{RT}\right) - \exp\left(-\frac{(1-\beta)F\eta}{RT}\right) \right), \quad \text{[Function 5]}$$

where $i_0$ is the exchange current density (A m$^{-2}$), $\beta$ is the anodic charge transfer coefficient, and $\eta$ is the over-potential (V) determined by Function 6:

$$\eta = \phi_s - \phi_e - U(c_{s,surf}), \quad \text{[Function 6]}$$

where U is the open circuit potential (V) which depends on the lithium concentration at the particle surface, $c_{s,surf}$ (mol m$^{-3}$). The exchange current density can be determined by Function 7 as follows $$i_0 = F k c_{s,surf}^{1-\beta} c_e^\beta (c_{s,max} - c_{s,surf})^\beta, \quad \text{[Function 7]}$$

where k is the reaction rate constant (m$^{1+3}$ mol$^{-s-1}$) and $c_{s,max}$ is the maximum lithium concentration in the particle (mol m$^{-3}$).

TABLE 2

Governing Functions and boundary conditions of the electrochemical model

| Domain | Governing Equations | | Boundary and Initial Conditions |
|---|---|---|---|
| Particle | $\frac{\partial c_s}{\partial t} = \frac{D_s}{r^2}\frac{\partial}{\partial r}\left(r^2 \frac{\partial c_s}{\partial r}\right)$ | F1 | $r=0: \frac{\partial c_s}{\partial r}=0;\ r=r_p: D_s \frac{\partial c_s}{\partial r} = -\frac{i}{F}$ <br> $t=0:\ c_s = c_{s0}$ |
| Electrode | $\frac{\partial}{\partial x}\left(\sigma_s^{eff}\frac{\partial \phi_s}{\partial x}\right) - a_s i = 0$ | F2 | $x=0: \phi_s = 0;\ x = l_n: \frac{\partial \phi_s}{\partial x} = 0;$ <br> $x = l_n + l_s: \frac{\partial \phi_s}{\partial x} = 0;\ x = l_n + l_s + l_p: \sigma_s^{eff}\frac{\partial \phi_s}{\partial x} = -i_{app}.$ |
| | $\frac{\partial}{\partial x}\left(\kappa_s^{eff}\frac{\partial \phi_e}{\partial x} + \kappa_D^{eff}\frac{\partial \ln c_e}{\partial x}\right) + a_s i = 0$ <br> where $\kappa_D^{eff} = -\frac{2RT\kappa_e^{eff}}{F}\left(1+\frac{d\ln f_\pm}{d\ln c_e}\right)(1-t_+)$ | F3 | $x=0: \frac{\partial \phi_e}{\partial x} = 0;\ x = l_n + l_s + l_p: \frac{\partial \phi_e}{\partial x} = 0.$ |
| | $\varepsilon_e \frac{\partial c_e}{\partial t} = \frac{\partial}{\partial x}\left(D_e^{eff}\frac{\partial c_e}{\partial x}\right) + \frac{(1-t_+)}{F}a_s i$ | F4 | $x=0: \frac{\partial c_e}{\partial x}=0;\ x = l_n + l_s + l_p: \frac{\partial c_e}{\partial x} = 0.$ <br> $t=0:\ c_e = c_{e0}$ |

Table 2 provides Function 1 (F1), Function 2 (F2), Function 3 (F3), and Function 4 (F4). In Table 2, $c_s$ is the lithium concentration in the solid (mol L$^{-1}$), $D_s$ is the lithium diffusivity in the solid (m$^2$ s$^{-1}$), $r_p$ is particle radius (m), F is the Faraday constant (C mol$^{-1}$), i is the intercalation current per unit area (A m$^{-2}$), $c_{s0}$ is the initial lithium concentration in the solid (mol L$^{-1}$), $\sigma_s^{eff}$ is the effective solid conductivity (S m$^{-1}$), $\phi_s$ is the potential in the solid (V), $a_s$ is the active surface area per unit electrode volume (m$^{-3}$), $i_{app}$ is the applied current density to the electrode (A m$^{-2}$) with the sign defined as $i_{app} > 0$ for discharge, $\kappa_e^{eff}$ is the effective electro- In Table 2, the active surface area per unit electrode volume (m$^{-1}$) can be determined by $a_s = 3\varepsilon_s / r_p$, where $\varepsilon_s$ is the solid volume fraction. The effective solid conductivity, effective electrolyte diffusivity and effective electrolyte conductivity can be determined by Function 8:

$$\sigma_s^{eff} = \sigma_s \frac{\varepsilon_s}{\tau_s},\ D_e^{eff} = D_e \frac{\varepsilon_e}{\tau_e},\ \kappa_e^{eff} = \kappa_e \frac{\varepsilon_e}{\tau_e}, \quad \text{[Function 8]}$$

where $\sigma_s$ is the solid bulk conductivity (S m$^{-1}$), $\tau_s$ is the solid tortuosity, $D_e$ and $\kappa_e$ are the bulk electrolyte diffusivity (m$^2$ s$^{-1}$) and conductivity (S m$^{-1}$), $\varepsilon_e$ is the electrolyte volume fraction and $\tau_e$ is the electrolyte tortuosity. The tortuosity of the solid and the electrolyte can be determined by Function 9 (e.g., by the Bruggeman relation), $$\tau = \varepsilon^{1-\alpha}, \tau_e = \varepsilon_e^{1-\alpha},$$  [Function 9]

where $\alpha$ is the Bruggeman exponent.

The differential equations in Functions 1, 2, 3 and 4 and the algebraic equations in Functions 5, 6, 7, 8 and 9 can be referred to as the full-order electrochemical model. These strongly coupled non-linear equations and functions of the full-order model can make the simulation computationally expensive. Thus, the battery management system 102 of the present technical solution can be configured with a reduced-order model as well as further improvements to reduce computational resource utilization and processing duration, while maintaining or improving the accuracy of the performance metric results, thereby allow for battery management on a real-time or near real-time bases in an electric or hybrid vehicle.

The battery management system 102 of the present technical solution is improved or optimized to reduce computational resource utilization, while providing an accurate result, by establishing the following configurations to be used by one or more of the components 106, 108 and 110: 1) the distribution of intercalation current density, i, across the electrode is uniform. Thus, the intercalation current density can be directly calculated from the applied current through the conservation of charge, thereby avoiding extensive iterations of the four partial differential equations; and 2) the solid conductivity and electrolyte conductivity is uniform in cathode, anode and separator.

The battery management system 102 can update, based on a uniform current density across an electrode thickness of the battery and via components 106, 108 and 110, the solid concentration model, the electrolyte concentration model, the electrolyte potential model, and the solid potential model. The outputs from the three components 106, 108 and 110 can further feed back to the battery controller component 112 to calculate the voltage and heat generation rate.

For example, the battery management system 102 can be configured with multiple functions. The functions can receive inputs corresponding to electrochemical parameters associated with a battery 130, profile information 116 of the battery, characteristics of electricity associated (e.g., current value, or current values as a function of time) with the battery 130. The functions can be based on a model, such as a full-order electrochemical model for a battery 130. However, the battery management system 102 of the present technical solution can be configured with improved techniques in order to reduce computational resource consumption and processing time, while maintaining or improving accuracy of the results by using a reduced-order electrochemical model. The battery management system 102, via one or more components 106, 108 and 110, can process the functions to determine an output performance-related metric, such as voltage level of the battery 130 or heat generation rate of the battery 130. The battery management system 102 can utilize a reduced order model configured for the lithium-ion battery to update at least one of the solid concentration model, the electrolyte concentration model, the electrolyte potential model, or the solid potential model.

To further improve efficiency, the battery controller component 112 can simultaneously provide the value of the current to multiple components of the battery management system 102 for processing in parallel, or in an at least partially overlapping manner. By having multiple components of the battery management system 102 independently process the input current value, the battery management system 102 can reduce delay in predicting or estimating a metric associated with battery performance, while also providing increased flexibility and tuning for processing techniques since the components can be independently configured and tuned to process the input current value. This process of providing the current information or values to each of the solid diffusion component 106, electrolyte transport component 108, and the electrolyte and solid potential component 110 can avoid iterations of several strongly-coupled non-linear partial differential equations, which can cause a high computational cost in a full order model.

For example, the battery management system 102 can include, interface or otherwise access a solid diffusion component 106. The solid diffusion component 106 can receive the value of the current and profile information for the battery 130 (e.g., electrochemical parameters of the battery 130, such as one or parameters identified in Table 1), and update a solid concentration model of the battery 130. The solid diffusion component 106 can load or initialize a model for the solid diffusion of the battery 130. The solid diffusion component 106 can retrieve the model for the solid diffusion from the model data structure or database stored in data repository 114. The solid diffusion component 106 can retrieve, load or otherwise initialize parameters from profile information 116 for the battery 130 stored in data repository 114. In some cases, the solid diffusion component 106 can pre-initialize or load the solid diffusion model for the battery 130, or any other parameters from profile 116, prior to receiving the value or time-dependent function of the current from the battery controller component 112. For example, the solid diffusion component 106 can load one or more parameters and initialize the solid diffusion model responsive to the vehicle 122 being turned on, or some other event, trigger, or condition separate from receiving the value of the current of the battery 130.

The solid diffusion component 106 can retrieve the solid diffusion model initialized, or configured based on an assumption that the current density across the electrode thickness is uniform. The battery controller component 112 can be configured to make the assumption that the current density across the electrode thickness is uniform, and provide the value of the current input based on a uniform electrode thickness of the battery 130. An electrode thickness can refer to the thickness of the anode or the cathode in the battery 130 (e.g., the anode and the cathode in a battery cell of the battery 130, or in each of multipole battery cells of the battery).

The solid diffusion component 106 can provide the solid diffusivity as a function of solid concentration. The solid diffusion component 106 can be configured to solve the diffusion equation using a finite difference method, finite volume method or finite element method. The solid diffusion component 106 can generate a concentration-dependent diffusivity. For example, for a lithium-ion based battery 130, the solid diffusivity can refer to the lithium diffusivity in the solid (m$^2$/s).

The solid diffusion component 106 can be configured with the Function 1 (F1) to determine the solid diffusivity, which can be given as a function of solid concentration.

| Domain | Governing Function 1 | | Boundary and Initial Conditions |
|---|---|---|---|
| Particle | $\dfrac{\partial c_s}{\partial t} = \dfrac{D_s}{r^2}\dfrac{\partial}{\partial r}\left(r^2 \dfrac{\partial c_s}{\partial r}\right)$ | [F1] | $r=0: \dfrac{\partial c_s}{\partial r}=0; r=r_p: D_s\dfrac{\partial c_s}{\partial r}=-\dfrac{i}{F}$ <br> $t=0: c_s=c_{s0}$ |

Function 1: Solid Concentration Function

The solid diffusion component 106 can use one or more techniques to process Function 1, such as a finite difference method to solve, finite volume or finite element. In the particle domain, the particle radius can be denoted as r. As illustrated in Table 2, $c_s$ is the lithium concentration in the solid (mol L$^{-1}$), $D_s$ is the lithium diffusivity in the solid (m$^2$ s$^{-1}$), $r_p$ is particle radius (m), F is the Faraday constant (C mol$^{-1}$), i is the intercalation current per unit area (A m$^{-2}$), $c_{s0}$ is the initial lithium concentration in the solid (mol L$^{-1}$), $\sigma_s^{\it{eff}}$ is the effective solid conductivity (S m$^{-1}$), $\phi_s$ is the potential in the solid (V), $a_s$ is the active surface area per unit electrode volume (m$^{-3}$), $i_{app}$ is the applied current density to the electrode (A m$^{-2}$) with the sign defined as $i_{app}$>0 for discharge, $\kappa_e^{\it{eff}}$ is the effective electrolyte conductivity (S m$^{-1}$), $\phi_e$ is the potential in the electrolyte (V), R is the gas constant (J K$^{-1}$ mol$^{-1}$), T is temperature (K), $f_\pm$ is the electrolyte activity coefficient, $t_+$ is the lithium ion transference number, $\varepsilon_e$ is the electrolyte volume fraction, $c_e$ is the lithium concentration in the electrolyte (mol L$^{-1}$), $D_e^{\it{eff}}$ is the effective electrolyte diffusivity (m$^2$ s$^{-1}$) and $c_0$ is the initial lithium concentration in the electrolyte (mol L$^{-1}$).

Thus, the solid diffusion component 106, configured to process Function 1, can update the solid concentration model, such as a polynomial profile of the battery 130, based on at least one of a finite difference technique, a finite volume technique, or a finite element technique. Based on the updated model, the solid diffusion component 106 can determine a solid concentration-dependent solid diffusivity of the battery 130, and provide the solid diffusivity information to the battery controller component 112 for further processing, or store the solid diffusivity information in the data repository 114 (e.g., in profile 116 or model 118).

The battery management system 102 can include, interface or otherwise access an electrolyte transport component 108. The electrolyte transport component 108 can receive the value of the current and profile information for the battery 130 (e.g., electrochemical parameters of the battery 130, such as one or parameters identified in Table 1), and update an electrolyte concentration model of the battery 130. The electrolyte transport component 108 can load or initialize a model for the electrolyte concentration of the battery 130. The electrolyte transport component 108 can retrieve the model for the electrolyte concentration from the model data structure or database stored in data repository 114. The electrolyte transport component 108 can retrieve, load or otherwise initialize parameters from profile information 116 for the battery 130 stored in data repository 114. In some cases, the electrolyte transport component 108 can pre-initialize or load the electrolyte concentration model for the battery 130, or any other parameters from profile 116, prior to receiving the value or time-dependent function of the current from the battery controller component 112. For example, the electrolyte transport component 108 can load one or more parameters and initialize the electrolyte concentration model responsive to the vehicle 122 being turned on, or some other event, trigger, or condition separate from receiving the value of the current of the battery 130.

The electrolyte in a battery 130 can include refer to a chemical medium that allows the flow of electrical charge between the cathode and anode. When a device or component of the vehicle 122 is connected to the battery 130, chemical reactions occur on the electrodes that create a flow of electrical energy to the device. An example electrolyte in a lithium based battery can include lithium salt, such as LiPF$_6$ in an organic solution. Since the electrolyte activity coefficient (e.g., a factor used to account for deviations from ideal behavior in a mixture of chemical substances) can have a dependence on the electrolyte concentration, the electrolyte transport component 108 can take into account an electrolyte activity coefficient to account for non-ideal behaviors of concentrated electrolyte. The electrolyte transport component 108 can analyze particle/electrolyte concentration profiles in order to generate and output the particle concentration profiles and electrolyte concentration profiles to the user.

The electrolyte transport component 108 can be configured with Function 4 identified in Table 2 to solve the governing equation of the electrolyte concentration. Further, when solving Function 3, the battery management system 102 can take into account the discontinuity of porosity across the cathode/separator interface and separator/anode interface. To solve Function 3, the battery management system 102 can use a finite volume method, finite difference or finite element technique.

The battery management system 102 can include, interface or otherwise access an electrolyte and solid potential component 110. The electrolyte and solid potential component 110 can receive the value of the current and profile information for the battery 130 (e.g., electrochemical parameters of the battery 130, such as one or parameters identified in Table 1), and update a solid potential and electrolyte potential of the battery 130. The electrolyte and solid potential component 110 can load or initialize a model for the solid potential and electrolyte potential of the battery 130. The electrolyte and solid potential component 110 can retrieve the model for the solid potential and electrolyte potential from the model data structure or database stored in data repository 114. The electrolyte and solid potential component 110 can retrieve, load or otherwise initialize parameters from profile information 116 for the battery 130 stored in data repository 114. In some cases, the electrolyte and solid potential component 110 can pre-initialize or load the electrolyte potential and solid potential model for the battery 130, or any other parameters from profile 116, prior to receiving the value or time-dependent function of the current from the battery controller component 112. For example, the electrolyte and solid potential component 110 can load one or more parameters and initialize the solid potential and electrolyte potential model responsive to the vehicle 122 being turned on, or some other event, trigger, or condition separate from receiving the value of the current of the battery 130.

The solid and electrolyte potential of the battery 130 can refer to or indicate the energy stored as chemical potential. The energy density of a battery 130 can be determined collectively by the specific capacity of the electrodes and the working voltage of the cell, which can be the differential potential between the cathode and the anode. The battery management system 102 can determine the solid potential, such as the potential related to the anode and cathode, as well as the electrolyte potential.

The electrolyte and solid potential component 110 can use the following processing configuration of: 1) the distribution of intercalation current density, i, across the electrode is uniform; and 2) the solid conductivity and electrolyte conductivity is uniform in cathode, anode and separator. By doing so, the electrolyte and solid potential component 110 can replace Functions 2 and 3 with the following Function 10 (F10) and Function 11 (F11) to update the electrolyte and solid potential model:

$$\phi_s = \begin{cases} \frac{i_{app}l_a}{2\sigma_{s,a}}\left\{\left(\frac{x}{l_a}-1\right)^2-1\right\}+V_n & (0 \le x \le l_a) \\ \frac{i_{app}l_c}{2\sigma_{s,c}}\left\{1-\left(\frac{x-l_a-l_s}{l_c}\right)^2\right\}+V_p & (l_a+l_s \le x \le l_a+l_s+l_c) \end{cases}$$ [F10]

and $$\phi_e =$$ [F11]

$$\begin{cases} i_{app}\left\{\frac{l_a}{2\kappa_{e,a}}\left[1-\left(\frac{x}{l_a}\right)^2\right]+\frac{l_s}{\kappa_{e,s}}+\frac{l_c}{2\kappa_{e,c}}\right\} + \\ \quad \frac{2RT}{F}(1-t_+)\ln\frac{c_e}{c_{eL}} & (0 \le x \le l_a) \\ i_{app}\left[\left(\frac{l_a+l_s-x}{l_s}\right)\frac{l_s}{\kappa_{e,s}}+\frac{l_c}{2\kappa_{e,c}}\right] + \\ \quad \frac{2RT}{F}(1-t_+)\ln\frac{c_e}{c_{eL}} & (l_a \le x \le l_a+l_s) \\ i_{app}\left[\left(\frac{x-l_a-l_s-l_c}{l_c}\right)^2\frac{l_c}{2\kappa_{e,c}}\right] + \\ \quad \frac{2RT}{F}(1-t_+)\ln\frac{c_e}{c_{eL}} & (l_a+l_s \le x \le l_a+l_s+l_c) \end{cases}$$

Thus, by processing the Function 10 and 11, the electrolyte and solid potential component 110 can determine or update the electrolyte potential model and solid potential model using a more efficient analytical function, as well is in a manner that is at least partially overlapping with the processing performed by one or more other component 106 and 108. The electrolyte and solid potential component 110 can provide the results to the battery controller component 112, or store the updated model in the data repository 114.

The battery management system 102 can include a battery controller component 112 designed, constructed, configured or operational to determine, predict, or estimate a value of a voltage of the battery 130 and a value of a heat generation rate of the battery 130. The battery controller component 112 can, for example, receive the output from each of components 106, 108 and 110 to determine the voltage or heat generation rate. The battery controller component 112 can receive the updated model from each of the components 106, 108 and 110. The battery controller component 112 can access the data repository 114 to retrieve the updated model. The battery controller component 112 can determine the voltage and heat generation rate based on the solid concentration model updated by the solid diffusion component 106, the electrolyte concentration model updated by the electrolyte transport component 108, the electrolyte potential model updated by the electrolyte and solid potential component 110, and the solid potential model updated by the electrolyte and solid potential component 110.

The battery controller component 112 can determine the heat generation rate based on the models updated by the components 106, 108 and 110. The battery controller component 112 can further determine a source of the heat generation rate. For example, the heat generation rate can be based on each of the electrolyte ohmic heat, the solid ohmic heat, the reaction heat, and the reversible heat. The battery controller component 112 can determine at least one of an electrolyte ohmic heat, a solid ohmic heat, a reaction heat, or a reversible heat. The battery controller component 112 can provide a separate indication for one or more of the electrolyte ohmic heat, the solid ohmic heat, the reaction heat, or the reversible heat.

For example, the battery controller component 112 can determine the total heat generation rate of the battery using Function 12 (F12):

$$Q_{total} = Q_{e,ohm} + Q_{s,ohm} + Q_{rxn} + Q_{rev},$$ [F12]

where $Q_{e,ohm}$ is the electrolyte ohmic heat, $Q_{s,ohm}$ is the electrode ohmic heat, $Q_{rxn}$ is the reaction heat and $Q_{rev}$ is the reversible heat, which can be determined using the set of Functions 13 as follows:

$$Q_{e,ohm} = \kappa_e^{eff}\left(\frac{\partial \phi_e}{\partial x}\right)^2 + \kappa_D^{eff}\left(\frac{\partial \ln c_e}{\partial x}\right)\left(\frac{\partial \phi_e}{\partial x}\right)$$ [F13]

$$Q_{s,ohm} = \sigma_s^{eff}\left(\frac{\partial \phi_s}{\partial x}\right)^2$$

$$Q_{rxn} = a_s i(\phi_s - \phi_e - U)$$

$$Q_{rev} = a_s iT \frac{\partial U}{\partial T}$$

where $\kappa_e^{eff}$ is the effective electrolyte conductivity (S m$^{-1}$), $\phi_e$ is the potential in the electrolyte (V), $$\kappa_D^{eff} = -\frac{2RT\kappa_e^{eff}}{F}\left(1+\frac{d\ln f_+}{d\ln c_e}\right)(1-t_+),$$

$c_e$ is the lithium concentration in the electrolyte (mol L$^{-1}$), $\sigma_s^{eff}$ is the effective solid conductivity (S m$^{-1}$), $\phi_s$ is the potential in the solid (V), $a_s$ is the active surface area per unit electrode volume (m$^{-3}$), i is the intercalation current per unit area (A m$^{-2}$), U is the open circuit potential (V), T is the temperature (K), and $$\frac{\partial U}{\partial T}$$

is the entropy coefficient (V K$^{-1}$).

The battery controller component 112 can generate, based on the value of the voltage of the battery and the value of the heat generation rate of the battery, a command to manage a performance of the battery. The command can include a notification, indication, instruction, control command, or other output based on the value of the voltage and the heat generation rate.

For example, the battery controller component 112 can determine that the voltage is less than or equal to a predetermined threshold. Responsive to determining that the voltage is less than the predetermined threshold, the battery controller component 112 can generate an instruction, notification or other indication to charge the battery or an indication of remaining battery power to display via a display device of the vehicle. In another example, the battery controller component 112 can determine that the voltage is greater than or equal to a predetermined threshold. Responsive to determining that the voltage is greater than or equal to the predetermined threshold, the battery controller component 112 can generate a command, instructions, control or other indication to stop or terminate charging of the battery 130.

The battery controller component 112 can determine that the heat generation rate is greater than or equal to a predetermined threshold. Responsive to determining that the heat generation rate is greater than or equal to the predetermined threshold, the battery controller component 112 can generate a command, instructions, control or other indication to stop or terminate charging of the battery 130, or accessing power from the battery (or a battery cell of the battery). The battery controller component 112, responsive to a comparison of the voltage with a voltage threshold, or the heat generation rate with a heat generation rate threshold, can generate a command with an instruction to reduce the amount of current output by the battery 130. For example, the battery controller component 112 can terminate, responsive to the value of the heat generation rate being greater than or equal to the threshold, current output from one or more cells of the battery 130, thereby at least partially disabling the battery 130 in order to increase the longevity of the battery 130. The battery controller component 112 can terminate, responsive to the value of the heat generation rate being greater than or equal to the threshold, current input to one or more cells of the battery 130, thereby at least partially disabling or terminating charging of the battery 130 in order to increase the longevity of the battery 130.

Using the output from the one or more components 106, 108 and 110, the battery controller component 112 can determine the value of the voltage of the battery based on an open circuit voltage hysteresis effect. The open circuit voltage hysteresis effect can be based on a difference between a charging open circuit voltage curve and a discharging open circuit voltage curve. For example, the battery controller 112 can use or be configured with a one-state hysteresis model to determine or take into account the open circuit voltage (OCV) hysteresis effect. The average OCV can be defined according to Function 14 (F14):

$$U_{av}(SOC) = \frac{U_{dis}(SOC) + U_{cha}(SOC)}{2} \quad [F14]$$

where SOC is the state of charge which given by the lithium concentration in the solid, $U_{dis}(SOC)$ is the discharging open circuit voltage as a function of SOC, and $U_{cha}(SOC)$ is the charging open circuit voltage as a function of SOC. The magnitude of the hysteresis effect can be defined according to Function 15 [F15]

$$E(SOC) = \frac{U_{cha}(SOC) - U_{dis}(SOC)}{2} \quad [F15]$$

The battery controller component 112 can use or be configured with the first order relaxation Function 16 (F16) to model the hysteresis voltage, $V_H$, $$\frac{dV_H}{dt} = -\frac{V_H}{\tau_H} + \text{sgn}(i)\frac{E(SOC)}{\tau_H} \quad [F16]$$

where i is current, sgn( ) is the sign function, and $\tau_H$ is a fitted parameter. The battery controller 112 can solve Function 16 using an appropriate initial condition.

The battery controller 112 can determine the final open circuit voltage with the consideration of the hysteresis effect using Function 17 (F17)

$$U = U_{av}(SOC) + V_H \quad [F17].$$

The battery management system 102 (e.g., via controller component 112) can generate a command including an instruction to cause the onboard computing unit 124 of the vehicle 122 to execute an action such as displaying a notification via a display device 128 (e.g., vehicle dash, LCD, LED, or other electronic or digital visual display communicatively coupled to the onboard computing unit 124). For example, the visual output can include an alert, notification, warning, or suggestion to adjust, change, or terminate a function or aspect of the vehicle 122.

The battery management system 102 can generate the command in real-time responsive to receiving, measuring or detecting the value of the current. Generating the command in real-time can refer to generating the command within 1 minute, 2 minutes, 3 minutes, 4 minutes, 5 minutes, 6 minutes, or 10 minutes of detecting or determining the current output value of the battery 130. Generating the command in real-time can refer to generating a command indicative or responsive to the characteristic or performance of the battery 130 that is currently in use in the vehicle 122. Generating the command in real-time can refer to generating a command configured to improve a characteristic or behavior associated with the battery 130 or vehicle 122.

Figure 2:
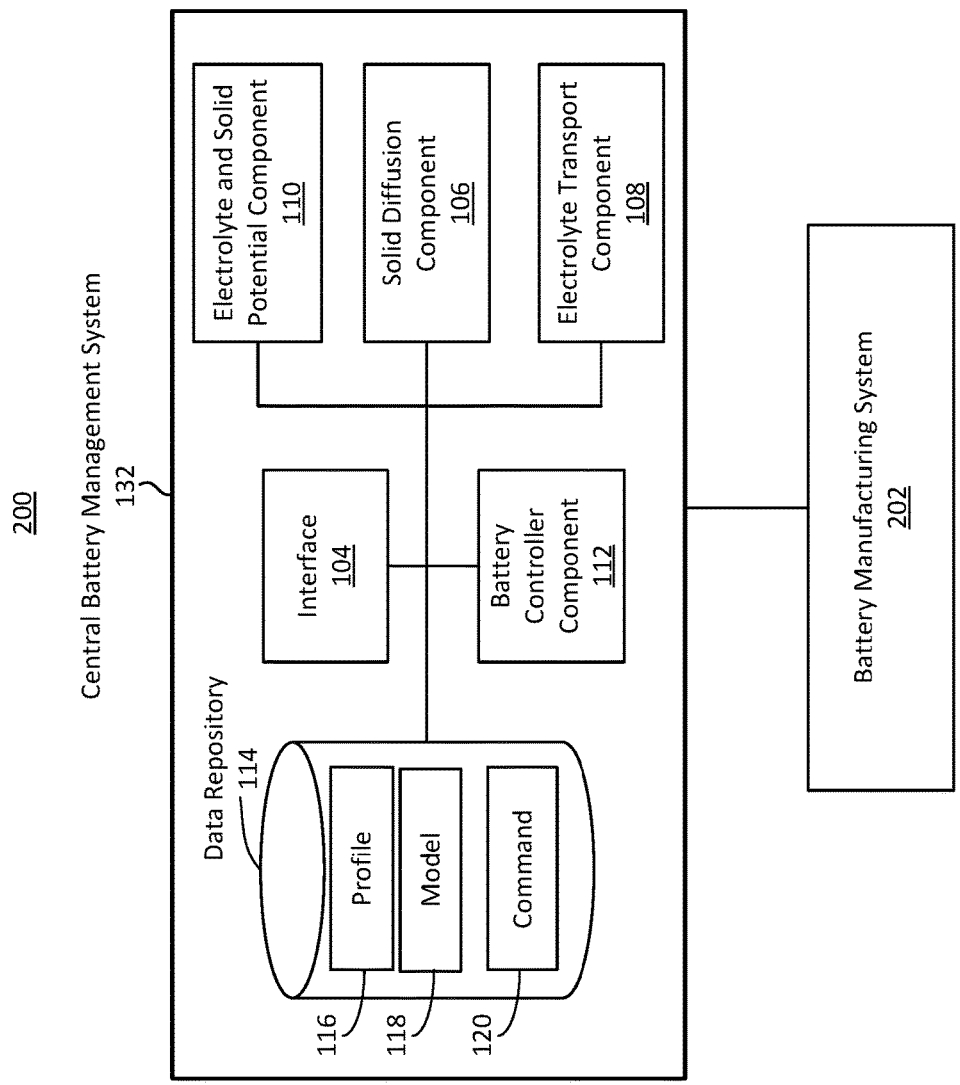
FIG. 2 depicts a block diagram depicting an example system to manage battery performance to facilitate manufacturing of a battery, in accordance with an implementation.

FIG. 2 depicts a block diagram depicting an example system to manage battery performance to facilitate manufacturing of a battery, in accordance with an implementation. The system 200 can include the central battery management system 132 depicted in FIG. 1. The system 200 can include a battery manufacturing system 202. The battery manufacturing system 202 can refer to or include components or processes related to designing aspects of a battery 130, manufacturing a battery 130, or testing a battery 130. The central battery management system 132 can be configured to simulate battery performance, such as simulate, for a given battery profile and input time-dependent current values, an output voltage of the battery and the heat generation rate of the voltage. The central battery management system 132 can run simulations of the battery performance based on models 118 and profile 116 information in order to test whether a battery having the profile 116 functions in a desired manner. The central battery management system 132 can output or provide for display a particle concentration profile and an electrolyte concentration profile of the battery 130 that is being tested or under simulation.

The central battery management system 132 can include one or more component or functionality of the battery management system 102. The central battery management system 132 can communicate with or receive or transmit data with the battery management system 102 via a network 101. The central battery management system 132 can be configured to run simulations on battery performance, and identify desired configurations for the battery 130. Upon identifying a desired configuration for the battery 130, or otherwise validating a battery configuration based on performance metrics such as heat generation rate and voltage levels, the central battery management system 132 can provide an indication of the validated or desired battery profile for use in a battery manufacturing system 202 (e.g., a battery design process).

Figure 3:
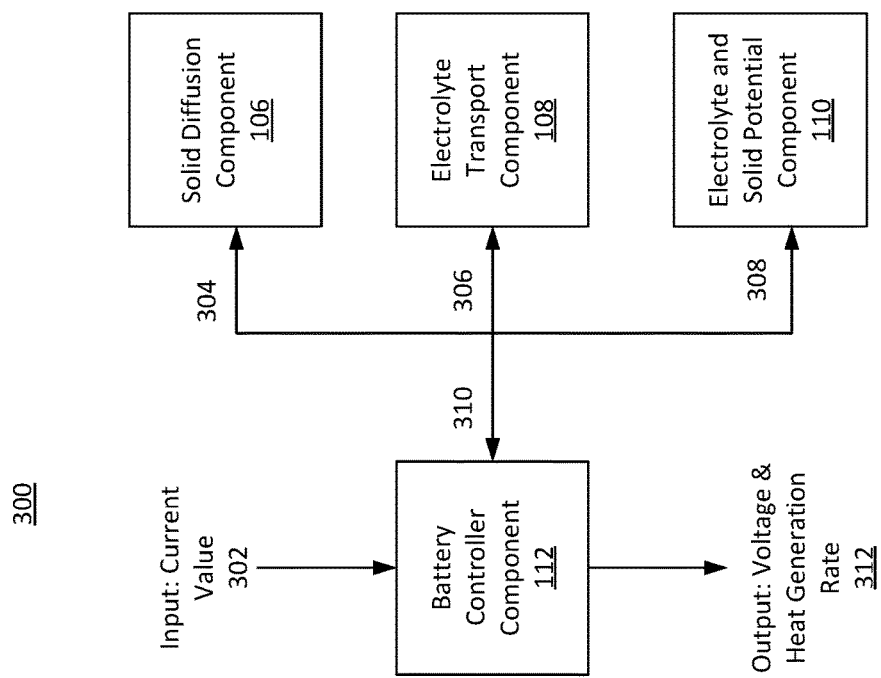
FIG. 3 depicts an example operational diagram of a system to manage battery performance of a vehicle, in accordance with an implementation.

FIG. 3 depicts an example operational diagram of a system to manage battery performance of a vehicle, in accordance with an implementation. The operation 300 can be performed by one or more system, component or function depicted in FIG. 1, FIG. 2 and FIG. 6. For example, the operation can be performed by or via a battery management system 102, battery controller component 112, electrolyte and solid potential component 110, solid diffusion component 106, or electrolyte transport component 108. At 302, the battery controller component 112 receives, as input, a current value. The battery controller component 112 can receive the current value as a time-dependent function. The current value can include a time series of current measurements. The current measurements can be real, physical measurements of the current being output by a battery of a vehicle, for example. The current measurements can be simulated current values from a computer simulation of a battery.

At 304, the battery controller component 112 can provide the current value as input to the solid diffusion component 106. At 306, the battery controller component 112 can provide the current value as input to the electrolyte transport component 108. At 308, the battery controller component 112 can provide the current value as input to the electrolyte and solid potential component 110. The battery controller component 112 can provide the current value at 304, 306, and 308 in parallel, simultaneously, in an overlapping manner, or serially. The battery controller component 112 can provide the current value to each of the components 106, 108 and 110 to cause the components 106, 108 and 110 to process the input current in an at least partially overlapping manner. Each of the components 106, 108 and 110 can be tuned or configured with separate processing techniques to use to process the input current value.

At 310, the battery controller component 112 can receive the output or updated model information from each of the components 106, 108 and 110. At 312, the battery controller component 112, using the updated model information, can output a voltage value and a heat generation rate of the battery 130. The battery controller component 112 can further output commands, notifications, indications, or other information based on the voltage and heat generation rate.

Figure 4:
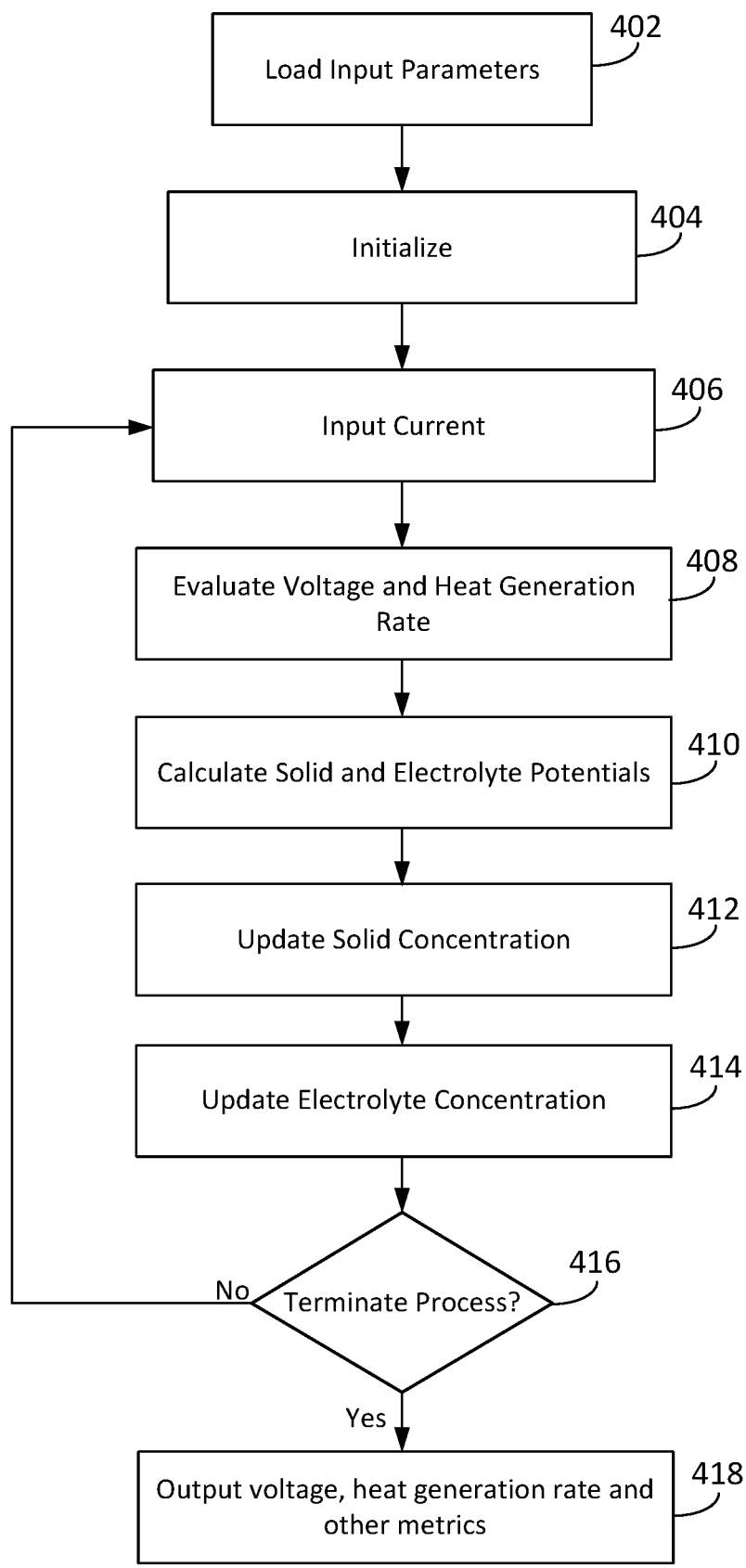
FIG. 4 depicts a flow diagram depicting an example method of managing battery performance of a vehicle, in accordance with an implementation.

FIG. 4 depicts a flow diagram depicting an example method of managing battery performance of a vehicle, in accordance with an implementation. The method 400 can be performed by one or more system, component or function depicted in FIG. 1, 2, 3, or 6, including, for example, by a battery management system, battery controller, solid diffusion component, electrolyte transport component, electrolyte and solid potential component, or sensors. At ACT 402, the method 400 can include the battery management system loading input parameters at 402. The input parameters can refer to profile information or electrochemical parameters associated with the battery. The input parameters can include, for example, parameters identified in Table 1.

At ACT 404, the battery management system can initialize one or more models. The battery management system (e.g., via battery controller) can initialize an electrolyte transport model, a solid diffusion model, an electrolyte potential model, or a solid potential model. At ACT 406, the input current is provided to the battery controller. The input current can be a current value in amperes, or a time series of current values, or the current as a time-dependent function. The input current can be from a physical battery, or a computer simulation.

At ACT 408, the battery controller can evaluate the voltage and heat generation rate. Evaluating the voltage and heat generation rate can be based on the models or further processing. For example, the electrolyte and solid potential component can calculate the solid and electrolyte potentials at ACT 410. The electrolyte transport component can update the solid concentration at ACT 412. The solid diffusion module can update the electrolyte concentration at ACT 414. Thus, ACTS 410, 412 and 414 can be performed by separate components of the battery management system, and may be performed sequentially, in parallel, or in an at least partially overlapping manner.

At ACT 416, the battery controller can determine whether the terminate the process 400. For example, the battery controller can determine to terminate the process if the determined voltage (e.g., via ACT 408) reaches an upper or lower limit or threshold of the battery. The battery can have a predetermined upper or lower voltage limit, such as a preset upper or lower voltage limit or a desired upper or lower voltage limit. If the battery controller determines that the voltage limits meets or exceeds a limit, the battery controller can terminate the simulation process 400. The battery controller can determine whether the concentration (e.g., as determined based on ACTS 412 or 414) reaches upper or lower limits for the battery, and terminate the process upon meeting the limit. The concentration limit can be set based on a profile for the battery, or desired concentration limits for the battery. The battery controller can determine whether the simulation has completed, such as a predetermined simulation duration, time-dependent current function, or vehicle simulation test.

At ACT 418, if the process has been terminated at decision block 416, the battery controller can output the voltage of the battery, the heat generation rate and other performance or battery related metrics. If the process has not terminated, then the battery controller can return to ACT 406 and process the next value of the current (e.g., if the current is a time-dependent function of current, then proceed to the next timestamp or time interval).

Figure 5:
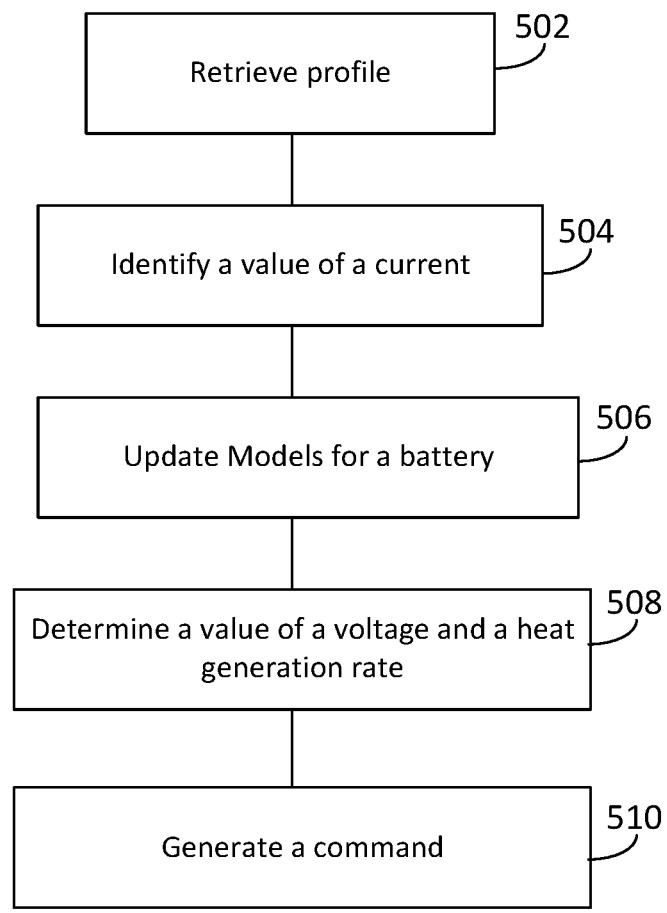
FIG. 5 depicts an example method of managing battery performance of a vehicle, in accordance with an implementation.

FIG. 5 depicts an example method of managing battery performance of a vehicle, in accordance with an implementation. The method 500 can be performed by one or more system, component or function depicted in FIG. 1, 2, 3, or 6, including, for example, by a battery management system, battery controller, solid diffusion component, electrolyte transport component, electrolyte and solid potential component, or sensors. At ACT 502, the method 500 can include the battery management system retrieving a profile for a battery. The battery management system can retrieve, from a database, a profile for a battery of a vehicle. The profile can include electrochemical parameters of a battery, or other parameters as identified in Table 1. The profile can include limits or thresholds associated with the battery. The profile can include battery types. The battery management system can receive the profile from a database or via a network.

The battery management system can identify a value of a current at ACT 504. The battery management system can identify the value of the current from a sensor, an ammeter, a time-dependent current function, time series of current measurements, or data file. The current can refer to the current output of a battery in amperes. The value of the current can correspond to an output by the battery supplying power to the vehicle.

At ACT 506, the battery management system can update one or more models for the battery. The battery management system can use one or more separate modules or components to update the models. For example, a solid diffusion component of the battery management system can update, based on the value of the current and the profile, a solid concentration model of the battery. An electrolyte transport component of the battery management system can update, based on the value of the current and the profile, an electrolyte concentration model of the battery. An electrolyte and solid potential component of the battery management system can update, based on the value of the current and the profile, an electrolyte potential model of the battery. The electrolyte and solid potential component can also update, based on the value of the current and the profile, a solid potential model of the battery.

At ACT 508, the battery management system can determine a value of a voltage and a heat generation rate for the battery. The battery management system can determine the voltage and heat generation rate based on the solid concentration model updated by the solid diffusion component, the electrolyte concentration model updated by the electrolyte transport component, the electrolyte potential model updated by the electrolyte and solid potential component, and the solid potential model updated by the electrolyte and solid potential component. The value of the voltage and heat generation rate can correspond to the input current value. The voltage and heat generation rate can correspond to an input current function.

At ACT 510, the battery management system can generate a command. The battery management system can generate, based on the value of the voltage of the battery and the value of the heat generate rate of the battery, a command to manage a performance of the battery. The command can include a notification, alert, instruction, or control command. The battery management system can output metrics associated with the models, such as the solid concentration, electrolyte concentration, solid potential, and electrolyte potential.

Figure 6:
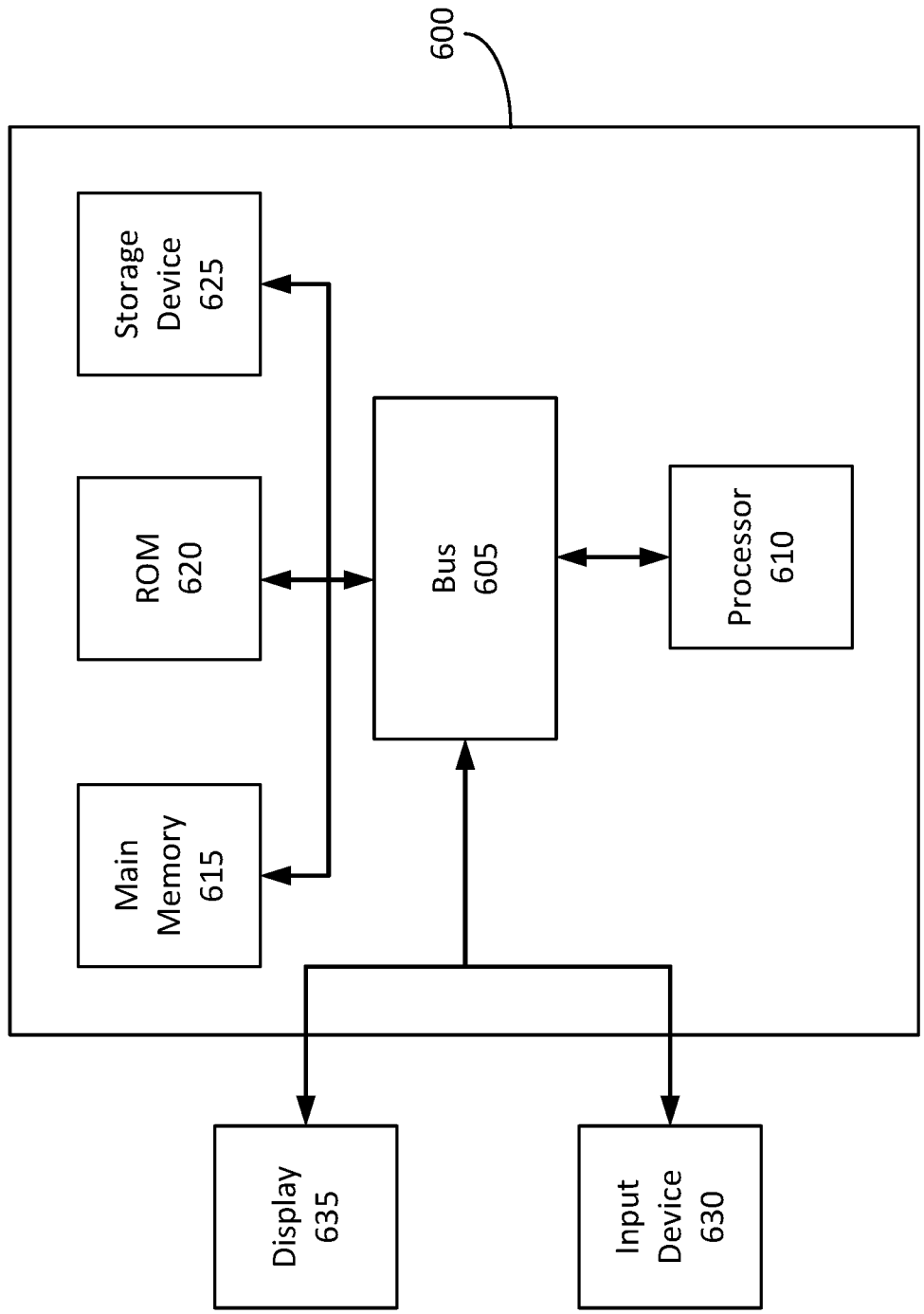
FIG. 6 is a block diagram illustrating an architecture for a computer system that can be employed to implement elements of the systems and methods described and illustrated herein, including, for example, the system depicted in FIGS. 1 and 2, operations depicted in FIG. 3, and the methods depicted in FIGS. 4 and 5.

FIG. 6 is a block diagram of an example computer system 600. The computer system or computing device 600 can include or be used to implement the battery management system 102, or its components such as the battery management system 102. The computing system 600 includes at least one bus 605 or other communication component for communicating information and at least one processor 610 or processing circuit coupled to the bus 605 for processing information. The computing system 600 can also include one or more processors 610 or processing circuits coupled to the bus for processing information. The computing system 600 also includes at least one main memory 615, such as a random access memory (RAM) or other dynamic storage device, coupled to the bus 605 for storing information, and instructions to be executed by the processor 610. The main memory 615 can be or include the memory 112. The main memory 615 can also be used for storing position information, vehicle information, command instructions, vehicle status information, environmental information within or external to the vehicle, road status or road condition information, or other information during execution of instructions by the processor 610. The computing system 600 may further include at least one read only memory (ROM) 620 or other static storage device coupled to the bus 605 for storing static information and instructions for the processor 610. A storage device 625, such as a solid state device, magnetic disk or optical disk, can be coupled to the bus 605 to persistently store information and instructions. The storage device 625 can include or be part of the memory 112.

The computing system 600 may be coupled via the bus 605 to a display 635, such as a liquid crystal display, or active matrix display, for displaying information to a user such as a driver of the vehicle 122. An input device 630, such as a keyboard or voice interface may be coupled to the bus 605 for communicating information and commands to the processor 610. The input device 630 can include a touch screen display 635. The input device 630 can also include a cursor control, such as a mouse, a trackball, or cursor direction keys, for communicating direction information and command selections to the processor 610 and for controlling cursor movement on the display 635. The display 635 (e.g., on a vehicle dashboard) can be part of the battery management system 102, the sensor 126, or other component of FIG. 1, as well as part of the vehicle 122, for example.

The processes, systems and methods described herein can be implemented by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors in a multi-processing arrangement may also be employed to execute the instructions contained in main memory 615. Hard-wired circuitry can be used in place of or in combination with software instructions together with the systems and methods described herein. Systems and methods described herein are not limited to any specific combination of hardware circuitry and software.

Although an example computing system has been described in FIG. 6, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components (e.g., arbitration component), and the positioning component 105 and map data illustrates one grouping of operations and responsibilities of these system components. Other groupings that execute similar overall operations are understood to be within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein may be embodied in other specific forms without departing from the characteristics thereof. Scope of the systems and methods described herein is thus indicated by the appended claims, rather than the foregoing description, and changes that come within the meaning and range of equivalency of the claims are embraced therein.

The invention claimed is:

1. A system to manage battery performance of a vehicle, comprising:
   a battery management system of the vehicle comprising one or more processors and memory;
   a database of the battery management system storing a profile for a battery of the vehicle;
   a sensor of the vehicle to identify a value of a current output by the battery that supplies power to the vehicle;
   a battery controller of the battery management system to:
   determine, based on the value of the current output and the profile and via a solid concentration model updated by a solid diffusion component, an electrolyte concentration model updated by an electrolyte transport component, an electrolyte potential model updated by an electrolyte and solid potential component, and a solid potential model updated by the electrolyte and solid potential component, a value of a voltage of the battery and a value of a heat generation rate of the battery; and
   generate, based on the value of the voltage of the battery and the value of the heat generation rate of the battery, a command; and
   provide the command to one or more component of the vehicle to cause a change in usage of the battery.

2. The system of claim 1, comprising:
   the battery controller to generate the command comprising an instruction to reduce the value of the current output by the battery.

3. The system of claim 1, comprising:
   the battery controller to generate the command comprising an indication of remaining battery power to display via a display device of the vehicle.

4. The system of claim 1, comprising:
   the battery controller to terminate, responsive to the value of the heat generation rate being greater than a threshold, current output from one or more cells of the battery.

5. The system of claim 1, comprising:
   the battery controller to terminate, responsive to the value of the heat generation rate being greater than a threshold, charging of one or more cells of the battery.

6. The system of claim 1, wherein the battery comprises a lithium-ion battery, comprising;
   the battery management system to utilize a reduced order model configured for the lithium-ion battery to update at least one of the solid concentration model, the electrolyte concentration model, the electrolyte potential model, or the solid potential model.

7. The system of claim 1, wherein the vehicle comprises an electrical vehicle, comprising:
   the battery management system to generate the command in real-time responsive to the value of the current output.

8. The system of claim 1, comprising:
   the battery management system to update, based on a uniform current density across an electrode thickness of the battery, the solid concentration model, the electrolyte concentration model, the electrolyte potential model, and the solid potential model.

9. The system of claim 1, wherein the profile comprises electrochemical parameters for the battery comprising at least one of a particle size, an electrode thickness, a porosity, or an open circuit voltage.

10. The system of claim 1, wherein the value of the current output is based on a time-dependent function.

11. The system of claim 1, comprising:
    the battery management system to update the solid concentration model of the battery based on at least one of a finite difference technique, a finite volume technique, or a finite element technique, wherein the solid concentration model comprises a polynomial profile; and
    the battery management system to determine a solid concentration-dependent solid diffusivity of the battery.

12. The system of claim 1, comprising:
the battery management system to update the electrolyte concentration model of the battery based on an electrolyte activity coefficient.

13. The system of claim 1, comprising:
the battery controller to determine the value of the voltage of the battery based on an open circuit voltage hysteresis effect, wherein the open circuit voltage hysteresis effect is based on a difference between a charging open circuit voltage curve and a discharging open circuit voltage curve.

14. The system of claim 1, comprising the battery controller to:
determine at least one of an electrolyte ohmic heat, a solid ohmic heat, a reaction heat, or a reversible heat, wherein the heat generation rate is based on each of the electrolyte ohmic heat, the solid ohmic heat, the reaction heat, and the reversible heat; and
provide a separate indication for one or more of the electrolyte ohmic heat, the solid ohmic heat, the reaction heat, or the reversible heat.

15. The system of claim 1, comprising:
the battery management system to provide, for display via a display device, a particle concentration profile and an electrolyte concentration profile of the battery.

16. A method of managing battery performance of a vehicle, comprising:
retrieving, by a battery management system of the vehicle comprising one or more processors and memory, from a database, a profile for a battery of the vehicle;
identifying, by a sensor of the vehicle, a value of a current output by the battery that supplies power to the vehicle;
determining, by a battery controller of the battery management system, based on the value of the current output and the profile and via a solid concentration model, an electrolyte concentration model, an electrolyte potential model, and a solid potential model, a value of a voltage of the battery and a value of a heat generation rate of the battery;
generating, by the battery controller, based on the value of the voltage of the battery and the value of the heat generation rate of the battery, a command; and
providing the command to one or more component of the vehicle to cause a change in usage of the battery.

17. The method of claim 16, comprising:
generating, by the battery controller, the command comprising an instruction to reduce the value of the current output by the battery.

18. The method of claim 16, comprising:
generating, by the battery controller, the command comprising an indication of remaining battery power to display via a display device of the vehicle.

19. The method of claim 16, comprising:
terminating, by the battery controller responsive to the value of the heat generation rate being greater than a threshold, current output from one or more cells of the battery.

20. The method of claim 16, comprising:
terminating, by the battery controller responsive to the value of the heat generation rate being greater than a threshold, charging of one or more cells of the battery.

* * * * *